(12) United States Patent
Comb et al.

(10) Patent No.: US 7,122,246 B2
(45) Date of Patent: Oct. 17, 2006

(54) HIGH-PRECISION MODELING FILAMENT

(75) Inventors: James W. Comb, Hamel, MN (US); William R. Priedeman, Jr., Long Lake, MN (US); Paul J. Leavitt, Minneapolis, MN (US); Robert L. Skubic, Chanhassen, MN (US); John Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 11/049,487

(22) Filed: Feb. 2, 2005

(65) Prior Publication Data

US 2005/0129941 A1    Jun. 16, 2005

Related U.S. Application Data

(60) Division of application No. 10/124,341, filed on Apr. 17, 2002, now Pat. No. 6,866,807, which is a continuation-in-part of application No. 09/960,133, filed on Sep. 21, 2001, now Pat. No. 6,547,995.

(51) Int. Cl.
    *D01F 6/00*    (2006.01)
(52) U.S. Cl. .................................... 428/364; 428/401
(58) Field of Classification Search ............... 428/364, 428/370, 401
    See application file for complete search history.

(56) References Cited

U.S. PATENT DOCUMENTS

| | | | |
|---|---|---|---|
| 4,595,816 A | 6/1986 | Hall et al. | |
| 4,902,462 A | 2/1990 | Bert | |
| 5,065,695 A | 11/1991 | Baron et al. | |
| 5,121,329 A | 6/1992 | Crump | |
| 5,173,310 A | 12/1992 | Katou et al. | |
| 5,340,433 A | 8/1994 | Crump | |
| 5,402,351 A | 3/1995 | Batchelder et al. | |
| 5,700,406 A | 12/1997 | Menhennett et al. | |
| 5,717,599 A | 2/1998 | Menhennett et al. | |
| 6,054,077 A | 4/2000 | Comb et al. | |
| 6,085,957 A | 7/2000 | Zinniel et al. | |
| 6,238,613 B1 | 5/2001 | Batchelder et al. | |
| 6,303,063 B1 | 10/2001 | Roberts et al. | |
| 6,468,651 B1 * | 10/2002 | Aikawa et al. ............. 428/364 |
| 6,547,995 B1 | 4/2003 | Comb | |
| 6,645,412 B1 * | 11/2003 | Priedeman, Jr. ............ 264/219 |
| 6,749,414 B1 | 6/2004 | Hanson et al. | |

\* cited by examiner

*Primary Examiner*—N. Edwards
(74) *Attorney, Agent, or Firm*—Kinney & Lange, P.A.

(57) ABSTRACT

Disclosed is a modeling filament for use as feedstock in a fused deposition modeling liquifier, and a method for manufacturing the filament. The diameter and standard deviation of the filament are controlled to meet various tolerance requirements of jam resistance, slip resistance, model strength, liquifier overflow prevention and hysteresis-free transient response. Standard deviation of the filament diameter is matched to a filament target diameter. The resulting filament is used to form high-quality models.

7 Claims, 10 Drawing Sheets

HIGH-PRECISION MODELING FILAMENT

CROSS-REFERENCE TO RELATED APPLICATION(S)

This application is a divisional application of application Ser. No. 10/124,341, filed Apr. 17, 2002, now U.S. Pat. No. 6,866,807 which is in turn a continuation-in-part of application Ser. No. 09/960,133, filed on Sep. 21, 2001, which has issued as U.S. Pat. No. 6,547,995 B1.

BACKGROUND OF THE INVENTION

The present invention relates generally to the fabrication of three-dimensional objects using extrusion-based layered manufacturing techniques. Specifically, it relates to modeling filament used as a feedstock in a fused deposition three-dimensional modeling machine.

Three-dimensional models are used for functions including aesthetic judgments, proofing a mathematical model, forming hard tooling, studying interference and space allocation, and testing functionality. Extrusion-based layered manufacturing machines build up three-dimensional models by extruding solidifiable modeling material from a nozzle tip carried by an extrusion head onto a base. The modeling material flows when heated, solidifies upon a drop in temperature, and adheres to the previous layer with an adequate bond upon solidification. Suitable materials include waxes, thermoplastic resins, and various metals. Movement of the extrusion head with respect to the base is performed in a predetermined pattern under computer control, in accordance with design data provided from a computer aided design (CAD) system.

Examples of extrusion-based apparatus and methods for making three-dimensional objects are described in Valavaara U.S. Pat. No. 4,749,347; Crump U.S. Pat. No. 5,121,329, Crump U.S. Pat. No. 5,340,433, Crump et al. U.S. Pat. No. 5,503,785; Danforth et al. U.S. Pat. No. 5,738,817, Danforth, et al. U.S. Pat. No. 5,900,207; Batchelder et al. U.S. Pat. No. 5,764,521 and Dahlin et al. U.S. Pat. No. 6,022,207, Swanson U.S. Pat. No. 6,004,124, Stuffle et al. U.S. Pat. No. 6,067,480 and Batchelder, et al. U.S. Pat. No. 6,085,957, all of which are assigned to Stratasys, Inc., the assignee of the present invention.

Modeling material may be provided to the extrusion head of a layered deposition modeling machine in various forms, including a liquid or solid feedstock of such material. The extrusion head will heat a solid feedstock to a flowable temperature for deposition. One technique provides the modeling material to the extrusion head in the form of a filament strand. A pressurization means is used to extrude molten modeling material from the extrusion head.

Stratasys® FDM® three-dimensional modeling machines of the current art use a software program to "slice" the CAD design of an object into multiple horizontal layers. The machines extrude modeling material in fluent strands, termed "roads" thereby building up the object layer-by-layer. Each extruded road has a thickness equal to the height of a slice. The material being extruded fuses to previously deposited material and solidifies upon a drop in temperature to form a three-dimensional object resembling the CAD model. The modeling material is typically a thermoplastic or wax material.

In the most frequently implemented configuration, the material feedstock is in the form of a filament. In the Stratasys® FDM® modeling machines of the current art which use a filament feedstock, modeling material is loaded into the machine as a flexible filament wound on a supply reel, such as disclosed in U.S. Pat. No. 5,121,329. Typically, the filament has a small diameter, such as on the order of 0.070 inches. The extrusion head, which includes a liquifier and a dispensing nozzle, receives the filament, melts the filament in the liquifier, and extrudes molten modeling material from the nozzle. Motor-driven feed rollers advance the strand of the filament into the liquifier. The motor-driven feed rollers push filament into the liquifier to create a "liquifier pump", wherein the filament itself serves as the piston. As the feed rollers advance filament into the liquifier, the force of the incoming filament strand extrudes the flowable material out from the nozzle. Typical extruded flow rates of the current art range from 0 to 20,000 micro-cubic inches per second.

The volumetric flow rate of the material extruded from the nozzle is a function of the rate at which the filament is advanced to the head. The flow rate is thus commanded by controlling the speed of advancement of filament into the liquifier. Optimally, the liquifier should reproduce the motion of the rollers in the emerging flow volume with perfect fidelity. A controller controls the movement of the extrusion head in a horizontal x-y plane, controls the movement of the base in a vertical z-direction, and controls the rate at which the feed rollers advance filament. By controlling these processing variables in synchrony, the modeling material is deposited in "roads" layer-by-layer along tool paths defined from the CAD model. The material being extruded fuses to previously deposited material and solidifies to form a three-dimensional object resembling the CAD model.

The extruded roads have a cross-sectional area that should ideally be precisely controlled to create an accurate model. Usually, a constant bead width is desired. The bead width is related to the extrusion head velocity, as well as the size of the nozzle orifice and the flow rate of material from the nozzle. The bead width is also affected by the clearance between the extruding nozzle tip and a previously extruded layer (or the base). When the extrusion head velocity changes, the output flow rate must change accordingly or a constant bead width will not be attained.

In an effort to achieve predictable extruded flow rates, modeling filament is manufactured to meet tolerance limits. Filament in the form of a cylinder with a target diameter of 0.070 inches in diameter is manufactured with a tolerance of +/−0.0025 inches. The filament is manufactured using an extrusion process wherein the target diameter is sought. The prior art methods verify tolerance using a laser micrometer during the manufacturing process and by measuring spooled filament with a micrometer after the filament has dried. The filament is deemed satisfactory it if there are no measurements larger than 0.0725 inches or smaller than 0.0675 inches.

In the modeling systems of the current art, bead width errors arise, particularly at start points and end points of the tool path, for instance, at the location of a "seam" (i.e., the start and end point of a closed-loop tool path). Bead width errors arise in part due to inconsistent flow rates. These errors cause undesired inconsistencies in the shape of the resulting model.

A technique for controlling the output flow rate so as to minimize bead width and seam errors is disclosed in U.S. Pat. No. 6,085,957. The '957 patent teaches the instantaneous sensing of filament diameter of a filament strand as it enters the liquifier, and consequent instantaneous adjustment of the feed rate of filament into the liquifier. While this technique does reduce errors, its has disadvantages in that each modeling machine must be equipped with a sensor, adding to the cost and maintenance of the machines. Also, using this technique, some errors have been observed to remain.

It would be desirable to further minimize bead width and seam errors in models made using fused deposition modeling techniques.

BRIEF SUMMARY OF THE INVENTION

The present invention is high-precision modeling filament for use as feedstock in an extrusion apparatus comprising a liquifier having an inner diameter $d_L$, and a method for forming a three-dimensional object using the modeling filament of the present invention. The liquifier receives the modeling filament and deposits it in molten form in roads having width W and height L. The modeling filament has an average diameter and standard deviation of its diameter which are controlled to meet various criteria of jam resistance, slip resistance, model strength, liquifier overflow prevention and hysteresis-free transient response.

Standard deviation of the diameter ($\sigma_F$) is matched to a filament target diameter. The target filament diameter $d_T$ is constrained according to the relationship $0.84\ L < d_T < d_L - 6\ \sigma_F$, to meet the jam resistance and slip resistance criteria. The standard deviation is constrained according to the relationship:

$$\sigma_F \leq \frac{2LWS_s}{3\pi d_T \Delta S_g},$$

to meet the hysteresis-free transient response requirement, where $\Delta Sg$ is expected average movement of a meniscus within the liquifier, $S_s$ is the maximum allowable gap in a seam, W is road width and L is road height. The standard deviation is further constrained to meet model strength and liquifier overflow prevention criteria, although these criteria may be redundant to the hysteresis-free transient response requirement.

The filament is manufactured so that the average filament diameter $<d_F>$ equals the target diameter. A particular filament manufactured in accordance with the teachings of the present invention, suitable for use in a 0.076 inch inner diameter liquifier, has a target diameter between 0.069 and 0.073 inches and a standard deviation of less than or equal to 0.0004 inches. The modeling filament of the present invention is used to form high-quality models.

DETAILED DESCRIPTION

The objects of the invention are to produce modeling filament having a diameter that meets tolerance limits established according to certain identified criteria, and to produce high-quality models using the modeling filament as feedstock. The present invention is based on the recognition that variances in filament diameter, as found in the prior art, can significantly degrade the performance of a fused deposition modeling liquifier resulting in a poor quality model. We will describe the tolerance limits of the present invention and a manufacturing process incorporating filament diameter control that will produce modeling filament that meets these limits.

Figure 1:
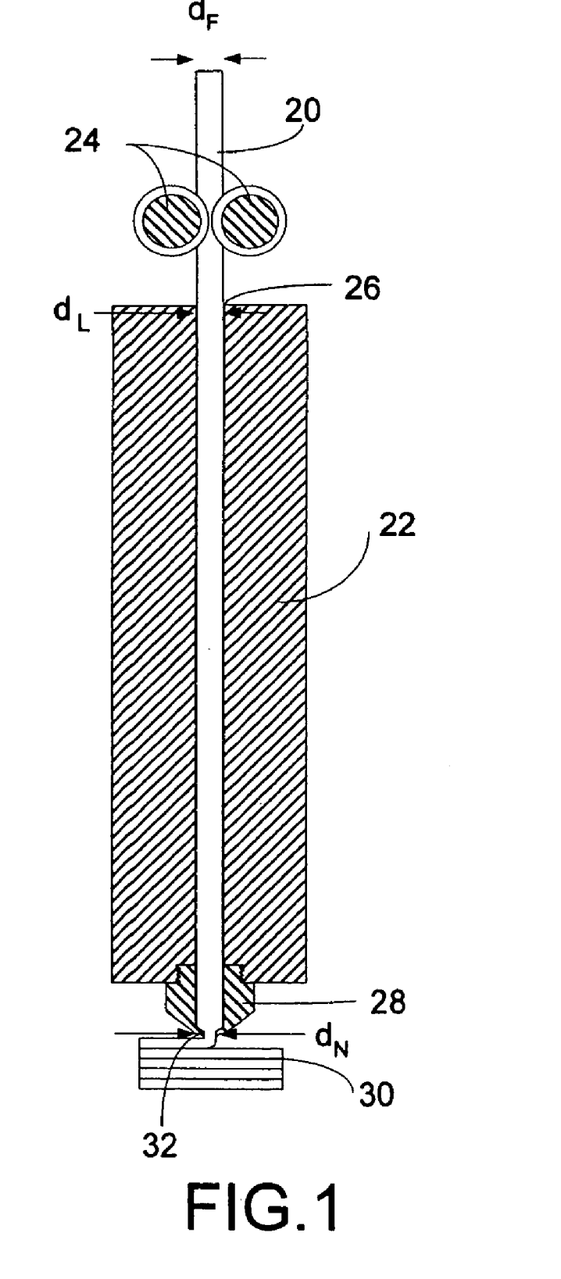
FIG. 1 is a plan view with portions in section of an embodiment of a liquifier.

FIG. 1 shows a cross-section of an exemplary liquifier 22, combined with a pair of feed rollers 24 that impel a strand of filament 20 into the inlet or cap 26 of the liquifier 22. The feed rollers 24 are driven at a controlled rate by a motor (not shown). A nozzle or tip 28 selectively deposits flowable thermoplastic onto a model 30 under construction. As illustrated, the filament 20 has an instantaneous diameter $d_F$, which necessarily must be smaller than an inner diameter $d_L$ of the liquifier 22.

In current modeling systems which include a liquifier such as shown in FIG. 1, the accuracy of the model created is dependent upon the accuracy of the filament supply. When the cross section of the filament varies, the volume of material delivered to the liquifier tip of the machine does not remain constant, causing the flow rate of material to fluctuate. For example, when the filament is too large, there may be a build-up of excess material at the liquifier tip, resulting in model layers that are overflowing with material. Similarly, when the filament is too small, there may be a shortfall or lag of material filling the part, resulting in a deposited layer that is too porous and causing poor surface finish and a weaker part. Both situations may easily lead to model failure. It has recently been discovered that even small variations in the filament diameter $d_F$ can cause unacceptable variations in the transient responses of the liquifier which can result in large variations in the quality of the final model, including gaps and excess thickness.

The present invention identifies several criteria that place limitations on the manufacturing tolerance of extruded filament feedstock in order to reduce variations in the flow thereby improving model quality.

Filament Diameter Tolerance:

According to the present invention, filament 20 is manufactured such that its diameter simultaneously satisfies several independent tolerance requirements. A filament target diameter $d_T$ is selected according to criteria of jam resistance and slip resistance. A standard deviation $\sigma_F$ is selected for the target diameter $d_T$, according to tolerance requirements of model strength, liquifier overflow prevention, and hysteresis-free transient response.

In the prior art, only the jam resistance and slip resistance criteria were recognized and met. Recent data has shown that the transient response of the liquifier is sensitive to small changes in the difference between the filament diameter and the liquifier inner diameter. The present invention recognizes that model quality is improved by limiting the standard deviation of the filament diameter according to the several criteria.

Jam Resistance:

If the filament diameter ever exceeds the inner diameter of the liquifier 22 at cap 26, the filament 20 will jam as it attempts to enter the liquifier 22. The tighter the standard deviation of the filament manufacturing process, the closer the filament target diameter $d_T$ can be to the inner diameter $d_L$ of the liquifier 22. In order to ensure that the filament 20 will not jam at the cap 26, we require:

$$d_T < d_L - 6\sigma_F \quad \text{Eq. 1}$$

In addition the relationship between $d_T$ and $d_L$ shown in equation 1 can further include a gap in the fit of the filament 20 into the liquifier 22, intended to accommodate any ovalization of the filament 20 that may occur from having been spooled. The ovalization gap can be represented by the variable $t_o$.

Slip Resistance:

Feed rollers 24 have a limited compliance. If the filament diameter shrinks below that allowed by compliance of the feed rollers, the filament 20 will not be fed into the liquifier at the desired rate and may jam at the inlet 26. Therefore another requirement for filament 20 that is fed by feed rollers 24 to the liquifier 22 is that the filament 20 must have sufficient diameter to allow effective propulsion into the liquifier 22 using the feed rollers 24.

Numerous different types of feed roller drives are possible and are known in the art, including elastomeric-coated rollers, serrated rollers and single or double spring-biased rollers. Likewise, additional rollers may be added in series with feed rollers 24. A spring-biased serrated roller drive has been found to have the greatest range of compliance. The allowable minimum filament diameter for a spring-biased serrated roller drive propelling filament 20 into liquifier 22 is:

$$d_T \geq 0.84 d_L \quad \text{Eq. 2}$$

Alternate examples using different drive types may have a different compliance, for example up to $d_T \geq 0.96 \, d_L$ depending on the drive type. Diameters below the compliance limit for a particular feed roller type cause the rollers to skid and the liquifier to cease to extrude material at the desired flow rates.

Model Strength:

Another modeling requirement is that the resulting model must have sufficient strength. If the diameter of filament 20 into the liquifier 22 is less than that expected, the extruded road 32 will be smaller than intended. The resulting model 30 may then have low fracture strength due to excessive porosity. This requirement can also be described as limiting the maximum porosity of the resulting model.

Figure 2:
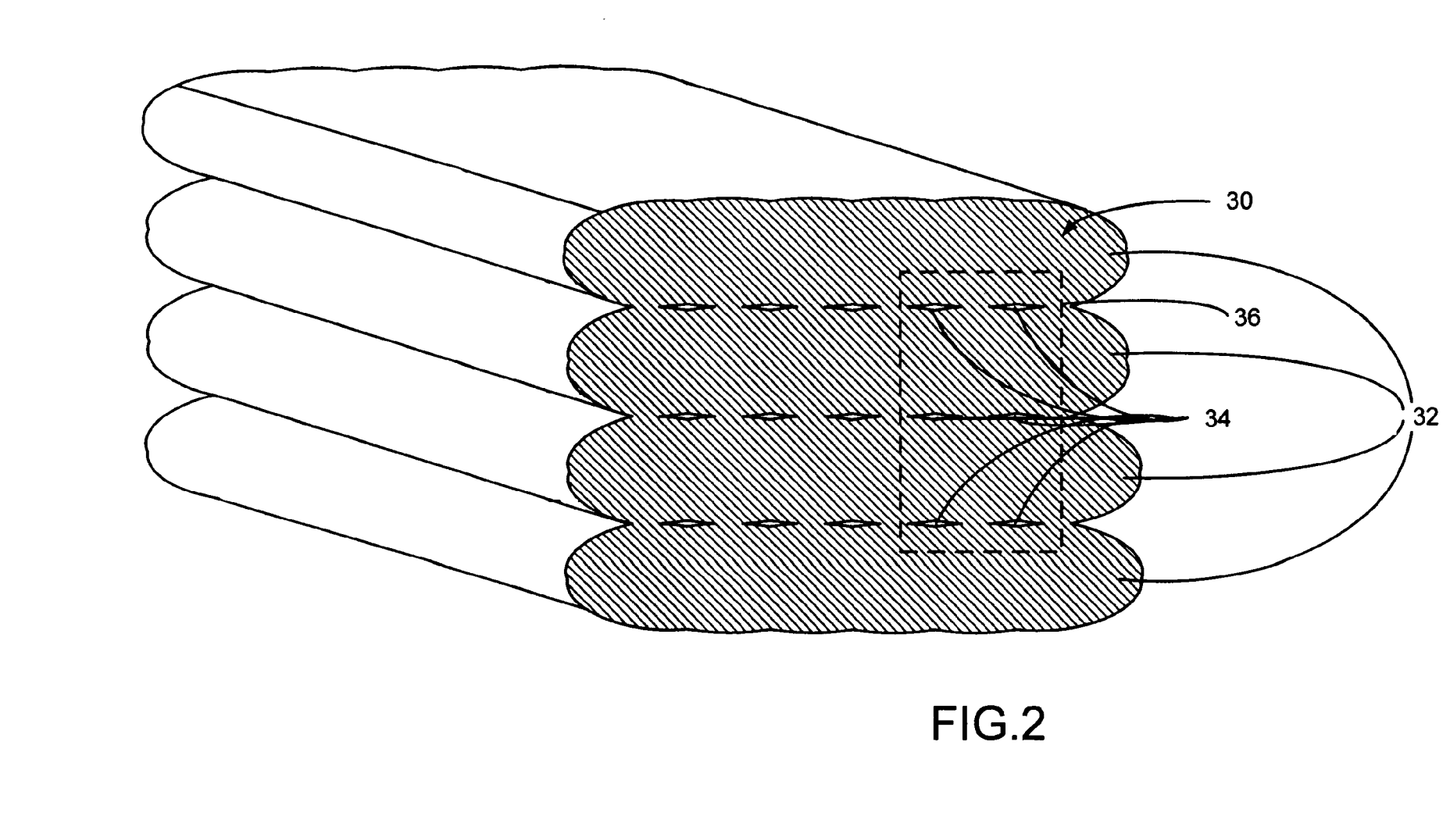
FIG. 2 is a sectional view of the exemplary model produced by fused deposition modeling.

FIG. 2 shows the model 30 in section. Twenty-four individual roads 32 of deposited modeling material have fused together to form the model 30. Small pores 34 remain at the conjunctions of the roads 32. The porosity of the model 30 can be empirically determined by measuring the cross-sectional area of all pores 34 within a defined cross-sectional area 36 of the model 30. In this example, the porosity of the model 30 is the cross-sectional area of all pores 34 divided by the area 36, given as a fraction. Alternatively, porosity may be expressed as a percentage.

Figure 3:
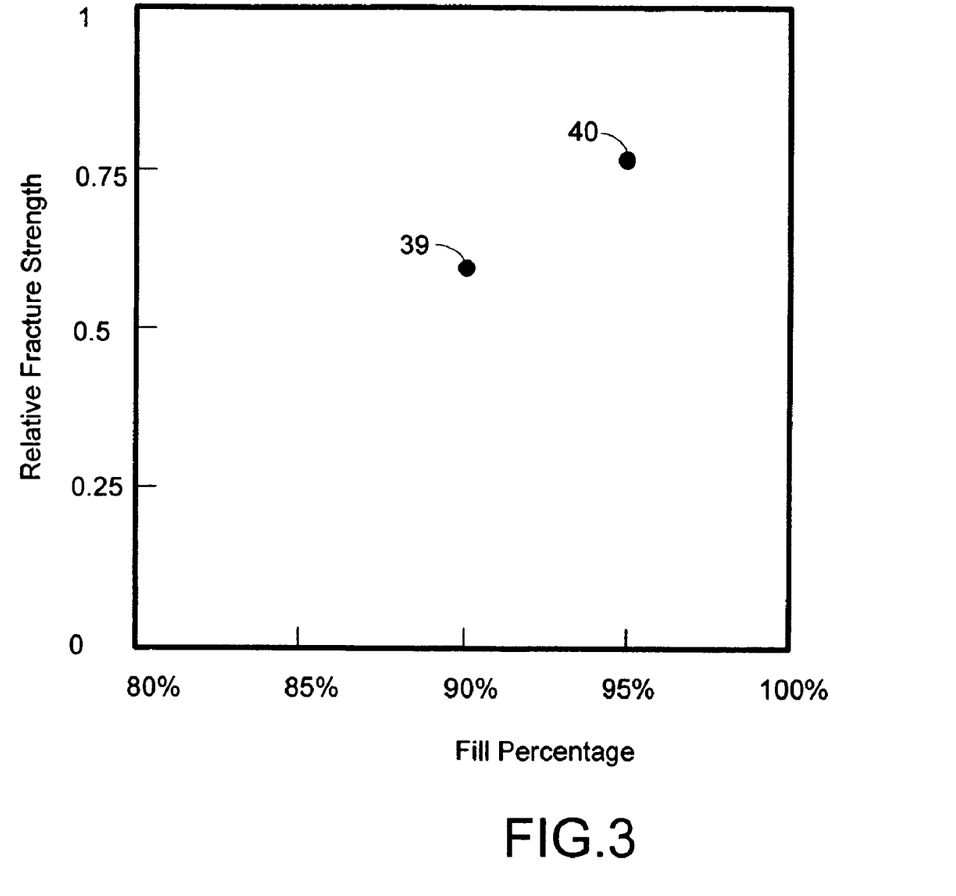
FIG. 3 is a graphical representation of fill percentage versus relative fracture strength of a polycarbonate model created by fused deposition modeling.

Fill percentage (F) is directly related to porosity by the relationship:

$$F/100 + P = 1 \quad \text{Eq. 3}$$

where F is a percentage and P is a fraction. Therefore the effects of porosity on the fracture strength of models may be considered in terms of fill percentage. For example, the strength of a polycarbonate model with 90% fill has been demonstrated to be significantly reduced as compared to a polycarbonate model with 95% fill, as shown by samples 39 and 40 on FIG. 3.

Empirically we find that, for polycarbonate, 75% of ultimate fracture strength is obtained with a fill (F) of 94%. It has been shown empirically that porosities of a few percent yield the same relative fracture strength for polycarbonate as for a variety of other amorphous thermoplastic modeling materials.

As described in U.S. Pat. No. 5,693,525, current fused deposition modeling systems seek to achieve a target model porosity. The target porosity is non-zero to accommodate process variations such as a standard deviation in the filament diameter. Therefore, the corresponding target fill percentage, $F_T$, is less than 100%. In steady state, the model fill percentage F will be:

$$F = \left(\frac{d_T \pm 3\sigma_F}{d_T}\right)^2 F_T \quad \text{Eq. 4}$$

The model strength will be determined by the lower limit of the fill percentage $(d_T - 3\sigma_F)$. Taking this lower limit and solving equation 4 for the standard deviation gives the following constraint on the standard deviation:

$$\sigma_F \leq \frac{d_T}{3}\left(1 - \sqrt{\frac{F}{F_T}}\right) \quad \text{Eq. 5}$$

Overflow Prevention:

Similar to the description of the model strength requirement above, if the filament diameter is greater than expected, the resulting model 30 can have poor surface finish due to over-filling. When the filament is too large, there is excess filament extruded from the liquifier tip, resulting in a road 32 that is locally too thick. The resulting bulge can cause surface blemishes. Therefore, there is an additional requirement that places an upper limit on filament diameter.

The filament can be oversized causing overflow when the upper limit of equation 4 is reached. Solving equation 4 for a fill percentage, F, of 100% and $(d_T + 3\sigma_F)$ gives the manufacturing tolerance:

$$\sigma_F \leq \frac{d_T}{3}\left(\sqrt{\frac{100}{F_T}} - 1\right) \quad \text{Eq. 6}$$

Hysteresis-free Transient Response:

Recent data has shown that the transient response of the liquifier is sensitive to small changes in the difference between the filament diameter and the liquifier inlet diameter. Transient effects due to changes in the rate of liquifier output can cause poor seam quality and inconsistent bead width. The transient effects are worsened by fluctuations in the filament diameter. It has been observed that the more closely and consistently the filament dimensions match the internal dimensions of the liquifier, the higher the quality of the model. The observed relationship between filament dimensions and the transient responses of the liquifier that effect model quality is complex.

During fused deposition modeling, the filament 20 is fed into the liquifier by feed rollers 24 and is melted. Therefore both molten modeling material and unmelted filament are present in the liquifier 22. The liquifier 22 is pressurized by the "pumping" of the strand of filament 20 into the liquifier 22 by feed rollers 24. The filament 20 acts as a piston. The pressurization impels the molten modeling material out of the tip 28 as previously shown in FIG. 1.

Figures 4A, 4B:
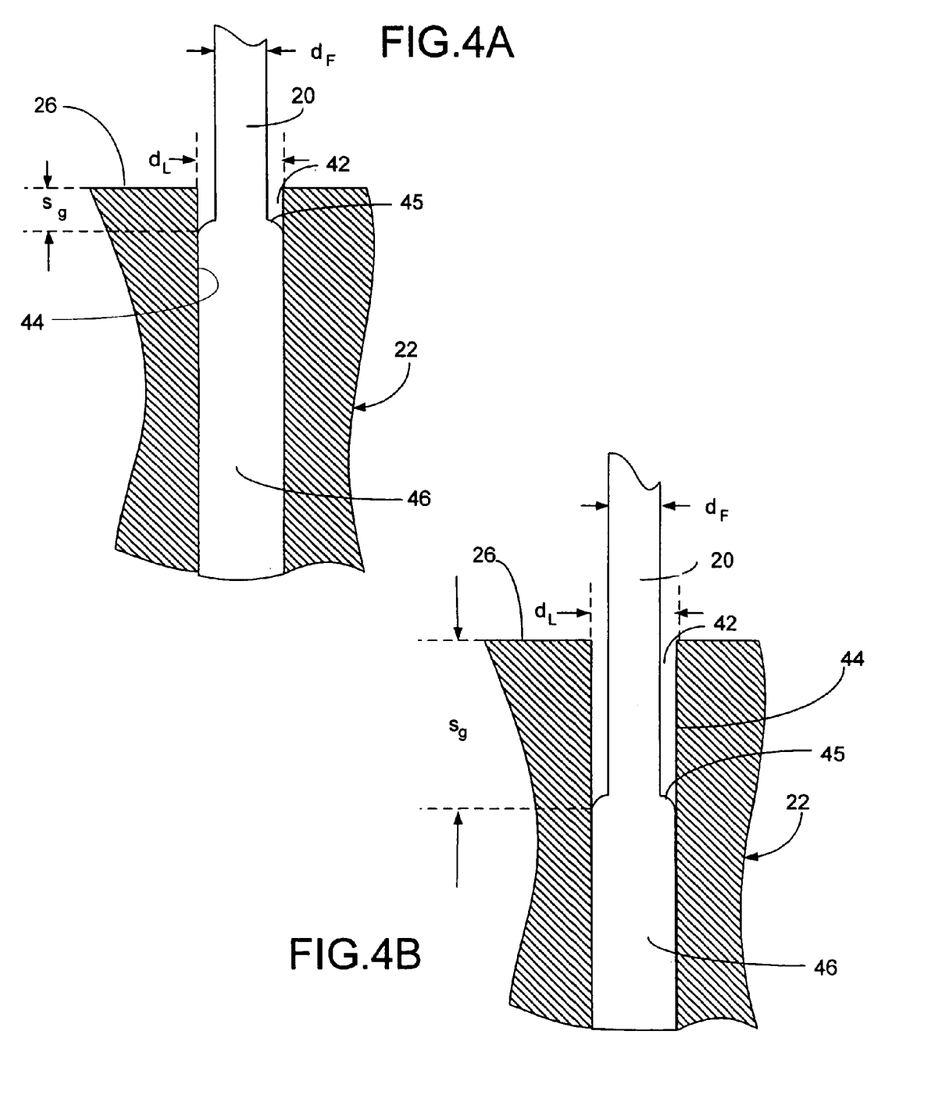
FIGS. 4A and 4B are plan views in partial section of the gap distance between unmelted filament and inner wall of liquifier at low and high feed rates, respectively.

The movement of the filament 20 into the liquifier 22 is represented in FIGS. 4A and 4B. FIG. 4A illustrates a slow filament feed speed and FIG. 4B illustrates a high feed speed. As shown, there is a gap 42 between the solid filament 20 and the inner wall 44 of liquifier 22. The gap 43 is typically filled with gas (e.g., air or modeling material fumes). FIGS. 4A and 4B also show a meniscus 45, created by solid filament 20 turning into molten modeling material 46. The meniscus 45 marks the point at which molten material 46 contacts inner wall 44 of the liquifier 22. When the filament 20 enters the liquifier 22 at a low speed, as shown in FIG. 4A, there is a small gap distance between the cap 26 of the liquifier and the meniscus 45. When the filament 20 is entering the liquifier 22 at a relatively high speed, the gap distance is larger as the meniscus 45 is at a lower position, shown in FIG. 4B.

If the rate at which the filament 20 is pumped into the liquifier 22 is changed, the amount of molten material 46 in the liquifier 22 changes, which in turn affects the pressure in the liquifier and related output flow. When the liquifier 22 extrudes slowly for a substantial time and then transitions to high flow rates, the liquifier 22 transiently over-extrudes as the gap distance is increased. When the liquifier 22 extrudes at a high rate for a substantial time and then transitions to low flow rates, the liquifier 22 transiently under-extrudes as the gap distance is decreased. In addition to varying with flow rate, it has been observed that the gap distance varies with viscosity, time on and time off, filament diameter, liquifier diameter, and non-Newtonian effects. The present invention recognizes that if filament diameter is held approximately constant, the behavior of the gap distance is simplified to allow easier control of the transient effects.

Figure 5:
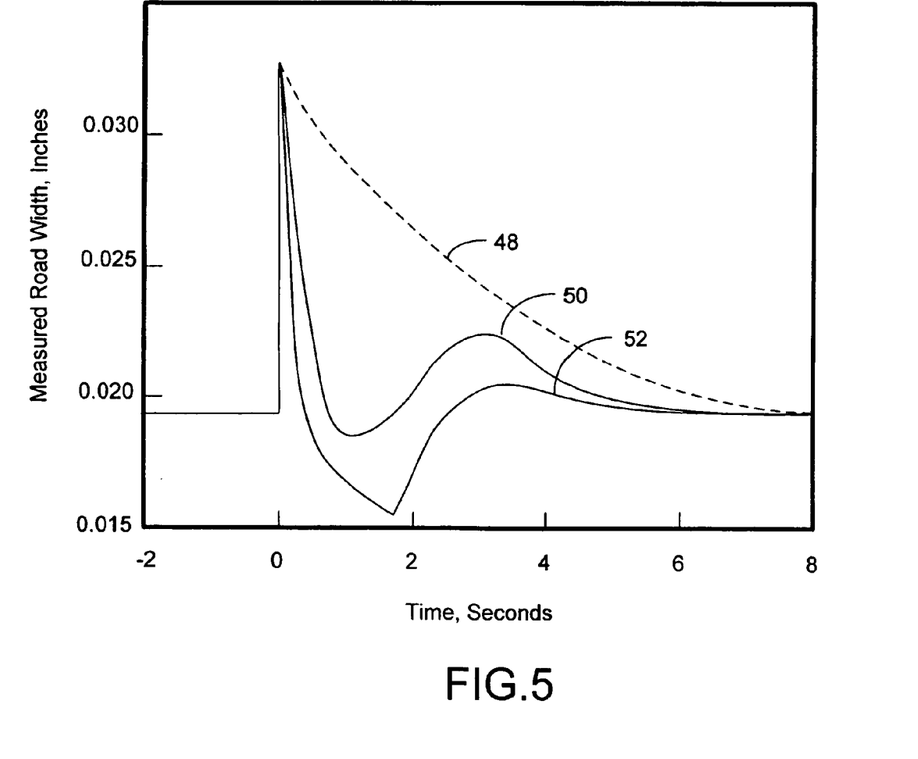
FIG. 5 is a graphical representation demonstrating hysteretic effect of road width.

Empirical data confirms that a constant filament diameter allows easier control of transient effects. FIG. 5 shows experimental data generated by measuring road width as a function of position for extrusion by a liquifier of inner diameter $d_L$=0.076 inches, using filament of two different diameters. The feed roller rate was held proportional to the liquifier tip velocity to produce a nominal 0.019 inch (19 mil) wide road. For a significant time prior to t=0, the liquifier was extruding at a relatively high rate 1,000 microcubic inches per second (MICs). At t=0, the liquifier velocity was abruptly slowed down to a speed corresponding to a steady state extrusion rate of 180 MICs. As described in U.S. patent application Ser. No. 09/960,133 filed Sep. 21, 2001, the presence of un-melted filament in the liquifier is expected to produce a transient surge in the liquifier output, corresponding to the dashed curve 48 in FIG. 5. The '133 application teaches adjusting the filament feed speed to account for the predicted surge, and is hereby incorporated by reference as if set forth fully herein.

FIG. 5 shows that the output flow varies with the average filament diameter, and that a greater difference between $<d_F>$ and $d_L$ causes transient effects with a greater differential from the expected output. Curve 50 in FIG. 5 represents measured transient effects using a 0.0707 inch diameter filament. Curve 52 represents measured transient effects using a 0.0683 inch diameter filament. Curves 50 and 52 demonstrate fluctuating transient responses that deviate from the expected curve 48. These fluctuating transient responses are undesirable because they are complicated and because they change with small variations in filament diameter. It should be recognized that the specific curves obtained will vary with material type, annular area between the liquifier inner diameter $d_L$ and the average filament diameter $<d_F>$, change in flow rate, and temperature (viscosity). It should also be recognized that the liquifier response is hysteretic in that it depends on the recent flow history of the liquifier.

Transient effects in output flow are caused by a volumetric error of material in the liquifier, attributable to both changes in rate of liquifier output and to variations in the filament diameter. In order to assess the effects of standard deviation in filament diameter on the flow rate, we consider the volumetric error due to changes in rate of liquifier output as well as the volumetric error caused by variations in the filament diameter.

We define the average volumetric error due to changes in rate of liquifier output $V_{err1}$, by the equation:

$$V_{err1} = \Delta S_g \pi (d_L^2 - d_T^2)/4 \qquad \text{Eq. 7}$$

where $\Delta S_g$ is defined as an average movement of the meniscus within a given liquifier as a seam is produced. As described above, as the filament velocity increases, the meniscus drops in the liquifier (e.g. going from FIG. 4A to FIG. 4B). Conversely, as the filament velocity slows, the meniscus rises in the liquifier. It is reasonable to assume that most seams created by a given modeling apparatus involve roughly the same geometry, accelerations, and decelerations, giving approximately the same meniscus movement. According to equation 7, any time there is meniscus motion there will be error. Also from equation 7, the closer the target diameter, $d_T$, is to the liquifier diameter, $d_L$, the smaller the volumetric error will be.

We define a total volumetric error $V_{err2}$, which includes error due to liquifier response rate changes (i.e., meniscus motion) and error due to filament diameter variations, as:

$$V_{err2} = (\Delta S_g \pi (d_L^2 - (d_T - 3\sigma_F)^2))/4 \qquad \text{Eq. 8}$$

The $d_T - 3\sigma_F$ is chosen to give the worst case error including improbable (part-per-thousand) cases. Having defined a total volumetric error and the volumetric error attributable to meniscus motion, the volumetric error attributable to variation in filament diameter is given by subtracting $V_{err1}$ from $V_{err2}$.

Figure 6:
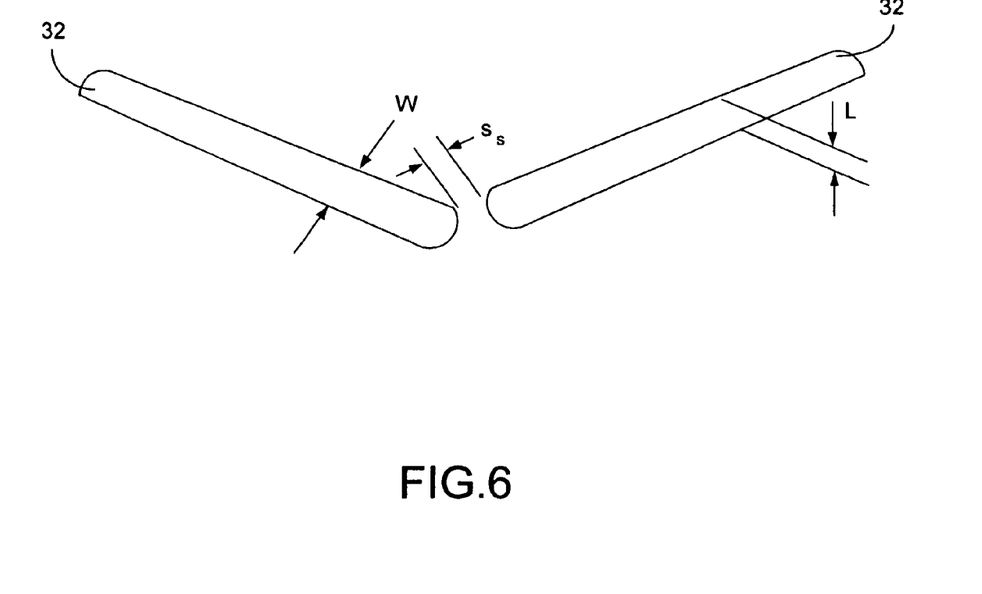
FIG. 6 is a perspective view showing gap distance in the exemplary model.

The volumetric error is related to road geometry. The effects of volumetric error on a seam are shown in FIG. 6, where roads 32 of width W and height L meet with a seam gap. We define the constant $S_S$ as the maximum allowable gap or overlap for a seam in a given system. $S_S$ has value for both an overfill, where the seams overlap, and a gap as shown in FIG. 6. The volumetric error is approximately equal to the seam error volume, estimated by the product of $S_s*W*L$.

The control parameters of the FDM® system can be adjusted to null the seam gap that is attributable to the liquifier response rate changes at starts and stops (i.e., $V_{err1}$). The seam gap cannot be entirely eliminated, however, as the standard deviation of the filament size will cause seams to have both gaps and over-fills. When there is compensation for the volumetric error attributable to the response rate changes at start and stop, the seam error exhibited represents the volumetric error that is attributable to variation in the filament diameter. In such a case, seam error is given by the following equation:

$$S_s LW = V_{err2} - V_{err1} \quad \text{Eq. 9}$$

Equations 7 and 8 are substituted into equation 9 and the polynomial is expanded. The term in $\sigma_F^2$ which results from multiplying out the polynomial may be discarded because it is small, resulting in:

$$S_s LW = \frac{3\pi \Delta S_g \sigma_F d_T}{2} \quad \text{Eq. 10}$$

Solving equation 10 for $\sigma_F$, gives the manufacturing tolerance required to achieve a seam gap no greater than $S_S$:

$$\sigma_F \leq \frac{2LWS_s}{3\pi d_T \Delta S_g} \quad \text{Eq. 11}$$

Figure 7:
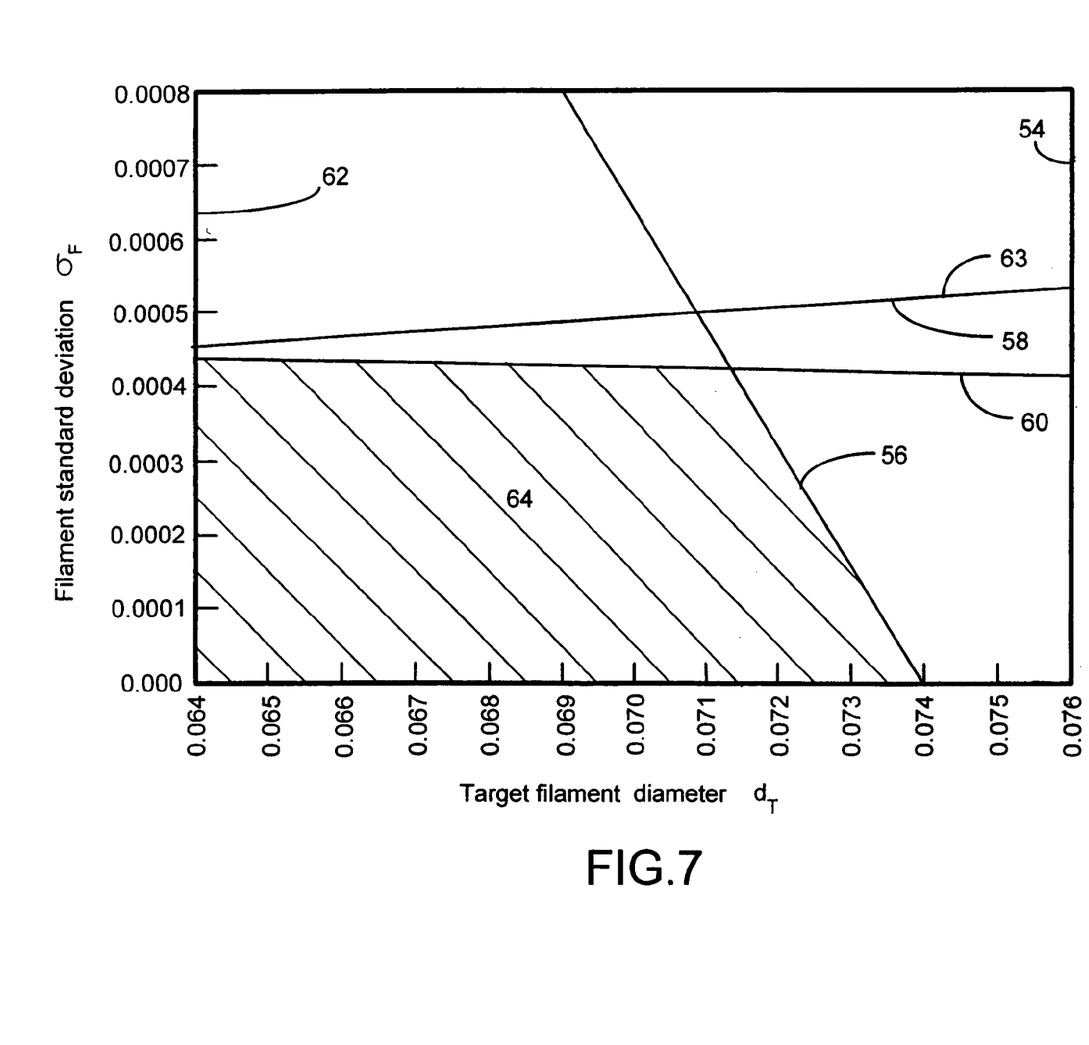
FIG. 7 is a graphical representation of filament tolerance limits according to the present invention.

The various tolerance limits of the present invention can be combined graphically or by linear programming to determine the required manufacturing tolerance. FIG. 7 shows the required relationship between the target filament diameter and the standard deviation of the filament diameter, for the example given below.

Implementation:

The production of high-precision filament according to the present invention is dependent on various parameters dictated by the filament's intended use in model creation. The liquifier inner diameter, $d_L$, is given by the liquifier in which the filament will be used. The road width W and height L are the road geometries of a given modeling system. The maximum allowable seam gap $S_S$ is chosen for a given modeling system, and is dependent on the feature fineness of models to be built by the system. The target fill percentage is chosen based on the needed relative fracture strength based on the end use of the model. These parameters are identified to implement the present invention.

By way of example, we consider a polycarbonate model built from a Stratasys® FDM® modeler of the current art, having a liquifier inner diameter $d_L$ of 0.076+/−0.001 inches, and a spring-biased serrated roller drive. To choose a target diameter $d_T$, we turn to equations 1 and 2 giving the jam resistance and slip resistance criteria. For the 0.076 inch nominal diameter liquifier with polycarbonate filament, a suitable ovalization gap $t_o$, is 0.001 inches. Considering the tolerance of the liquifier inner diameter and the gap, equation 1 becomes:

$$d_T < 0.074 - 6\sigma_F \quad \text{Eq. 12}$$

Substituting the nominal 0.076 diameter value for $d_L$ in equation 2, gives:

$$0.064 \leq d_T \quad \text{Eq. 13}$$

Next, we consider the model strength and liquifier overflow constraints. A good setting for the target fill percentage ($F_T$) is found from:

$$F_T = \frac{1}{2}(F + 100) \quad \text{Eq. 14}$$

since this places the target in the middle of the process window. Using equation 14, a fill percentage of at least 92% gives a target fill percentage of 96%. Substitution of these values into equation 5 gives the following filament manufacturing tolerance:

$$\sigma_F \leq 0.007 \cdot d_T \quad \text{Eq. 15}$$

The substitution of target fill percentage, $F_T$, of 96% into equation 6 gives the overfill prevention manufacturing tolerance:

$$\sigma_F \leq 0.007 \cdot d_T. \quad \text{Eq. 16}$$

Finally, we consider the hysteresis-free tolerance requirement. In a fused deposition modeling system of the current art, typical road size is in the range of 0.014 inches–0.035 inches for road width W, and 0.007 inches–0.013 inches for road height L. In the present example, exemplary values are set as W=0.020 inches, and L=0.010 inches. The largest expected movement in the meniscus $\Delta S_g$ is estimated at 0.030 inches, and the allowable seam gap, $S_S$ is set to be equivalent to the width of one road. Substituting these exemplary values into equation 11 gives the tolerance:

$$\sigma_F \leq \frac{0.0000283 \text{ in}^2}{d_T} \quad \text{Eq. 17}$$

Equation 17 assumes that the correct melt flow compensation has been calibrated for the case when $d_F=d_T$, according to the teachings of application Ser. No. 09/960,133.

Equations 12, 13, 15, 16, and 17 arrived at for the exemplary parameters are plotted together on a graph, shown in FIG. 7, to determine the allowable values for filament diameter and standard deviation.

The boundary line 54 in FIG. 7 is the liquifier inlet diameter $d_L$. The area to the left of line 56 satisfies the criteria of equation 12 so that the filament will not jam. The area to the right of line 62 satisfies the criteria of equation 13 for not slipping. The area below line 58 satisfies the criteria of equation 15 guaranteeing a predetermined model fracture strength. The area below line 'satisfies the criteria of equation 16 for preventing liquifier overflow. The area below curve 60 satisfies the criteria of equation 17 for good seam quality. The intersection of each of these areas 64 is the satisfactory range of values for the filament target diameter $d_T$ and standard deviation $\sigma_F$.

A target diameter is selected from the range given in area 64 of FIG. 7. For the selected target diameter, the demanded standard deviation must fall within the boundaries of area 64. It is observed that for the parameters of the present example, the strength and overflow requirements are redundant to the seam quality tolerance requirement, which is more limiting. Also, it is illustrated that the closer the demanded $d_T$ is to $d_L$, the smaller the standard deviation must be. In addition, from FIG. 5, the closer $d_T$ is to $d_L$, the easier it is to correct for transient effects. Thus, a good choice for a target filament diameter would be the intersection of curve 56 and 60. At this point, the standard deviation is maximized while minimizing the transient effects. From FIG. 7, this point would be at a target diameter of 0.0715 inches and standard deviation of 0.0004 inches.

The tolerance limits applied for a nominal 0.070 inch diameter filament in the prior art are ±0.0025 inches. The filament produced under the present invention will exceed the prior art tolerance limits, and will in addition have lesser fluctuations in diameter as constrained by the standard deviation. The modeling filament of the present invention results in models which better match a desired geometry.

Although a specific example is implemented, it should be understood that the values used for W, L, $S_s$, $\Delta S_g$, $d_L$, $t_o$ and $F_T$ are not limited to those values used in the implemented example. The values are generally selected based on the apparatus used and the characteristics of the model that is to be made. Therefore, changes in the apparatus effect the available values for $d_T$ and required $\sigma_F$ values to achieve high-precision filament as taught by the invention. Likewise, different model requirements for W, L, and $S_s$ will effect available $d_T$ and $\sigma_F$ values.

Exemplary Filament Manufacturing Embodiment:

A method for manufacturing filament according to the present invention will now be described. While the process has elements that will usefully produce filament for a large range of materials which solidify upon cooling, the exemplary manufacturing embodiment utilizes a drawing technique performed with thermoplastic materials having a relatively high glass transition temperatures $T_g$. Thermoplastic materials with glass transition temperatures above 106° Centigrade (measured by the DMA method) tend to demonstrate desired high viscosity of the just-extruded melt and the ability to withstand rapid cooling. Such materials are termed "high temperature thermoplastics" herein. The selection of high temperature thermoplastics for three-dimensional modeling is further described in pending U.S. patent application Ser. No. 09/854,220, hereby incorporated herein by reference.

Figure 8:
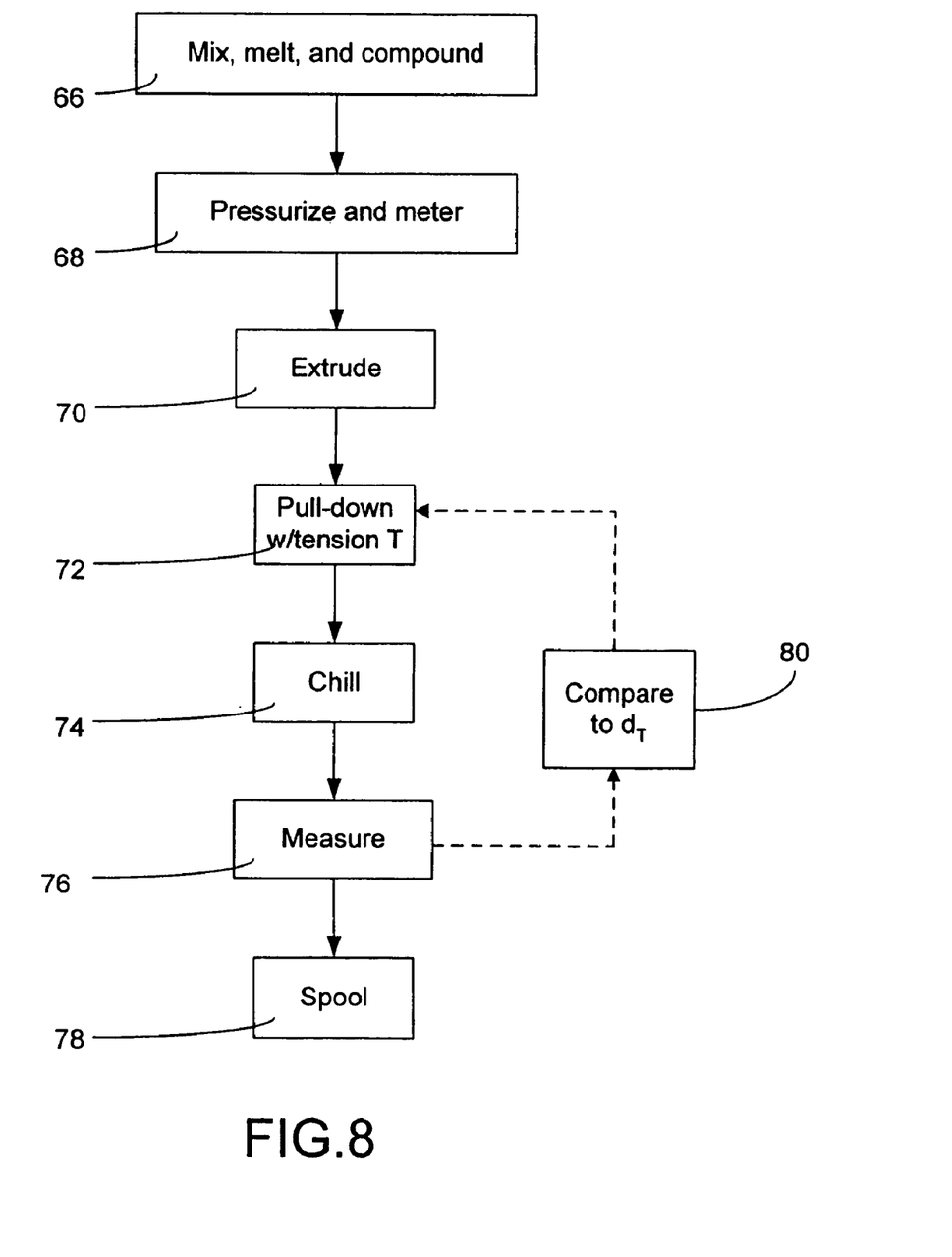
FIG. 8 is a flowchart of exemplary filament production steps.

FIG. 8 shows exemplary process steps for manufacturing filament in accordance with the present invention. The thermoplastic materials, whose flow through the chart is represented by solid arrows, are mixed, melted and compounded (box 66), then pressurized and metered (box 68). Next, filament is extruded (box 70), drawn-down under a controlled tension T (box 72), and chilled (box 74). The filament is next measured (box 76), prior to spooling (box 78). The filament measurement data, whose flow is represented by dashed arrows, is compared to a target value, e.g. $d_T$, (box 80). Based on results of the comparison, pull-down tension T is either increased, decreased, or maintained the same so as to control the filament size.

Figure 9:
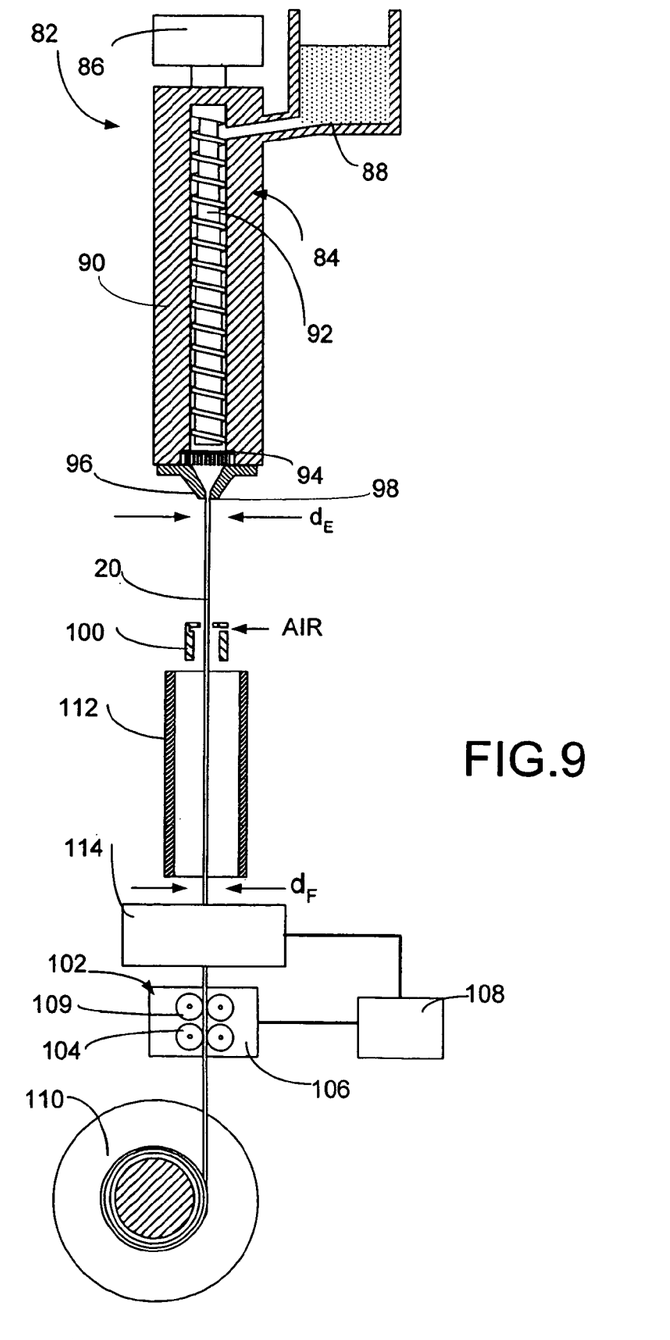
FIG. 9 is a plan view with portions in section of an embodiment of a filament forming apparatus.

FIG. 9 shows a plan view of an exemplary filament forming apparatus 82, which includes a screw extruder 84. Exemplary screw extruders 84 include those available commercially with dimensions 1–1.5 inches in diameter with an L/D (length to diameter) ratio of 24:1 or greater. Acceptable alternatives are known to those skilled in the art. The screw extruder 84 comprises a servo-controlled motor 86, a hopper 88, a barrel 90, a screw 92 which rotates inside the barrel 90, a filter pack and breaker plate 94, and a die 96 with a circular orifice 98. Alternatives may also incorporate a gear melt pump or other equivalent structures as is known in the art.

Filament 20 emerges from screw extruder 84, and, following draw-down and chilling, is wound onto a spool 110.

Many polymers, including high temperature thermoplastics such as polycarbonate, are hygroscopic. While not always required, drying of the pelletized stock material prior to loading into the hopper 88 is preferred as water present in the stock material can cause serious degradation of properties during the extrusion process. Drying may be done, for example, by desiccant, vacuum, and heat methods.

The thermoplastic materials include the pelletized thermoplastic stock material and may additionally include colorants, plasticizers, fillers, stabilizers, anti-oxidants, or other additives. The pelletized thermoplastic stock material, plus any desired colorants, plasticizers, fillers, stabilizers, anti-oxidants, and other additives are loaded into a hopper 88.

The thermoplastic materials inside hopper 88 feed into the screw extruder 84. The barrel 90 heats the materials. The screw 92 is driven by a servo-controlled motor 86. As the screw 92 rotates, it initially mixes, compounds and aids the melting of the materials. Viscous drag moves the materials further into the screw 92, generating a uniform pressure and flow rate to the die 96. Alternatively a gear melt pump may be attached to the screw extruder 84 to achieve the desired uniform pressure and flow rate to the die 96 as is known in the art.

In an exemplary embodiment, melted thermoplastic from the screw 92 passes through a filter pack and breaker plate 94. The size of the filter pack 94 is related to the size of the liquifier orifice in order to remove relatively large particles that may cause clogging, burrs or other imperfections during the fused deposition modeling process. For liquifier orifice inner diameters, $d_n$ (see FIG. 1) of 0.012 inches and higher, a satisfactory filter pack 94 consists of three screens, the finest of which has holes no larger than 0.003 inches. For smaller liquifier orifice inner diameters, the screen hole size should be decreased proportionally. Alternatives include passing the melt through a metal mesh canister filter or other high capacity filter.

Filtered, melted thermoplastic material is extruded from the die 96 through the circular orifice 98 as an over-sized filament 20 with diameter $d_E$, as shown in FIG. 9. The temperature of the thermoplastic materials within the screw extruder 84 must be maintained above $T_g$ so that the molten thermoplastic is sufficiently fluid to make extrusion of filament 20 possible. As the temperature of the die 96 is increased above $T_g$ the thermoplastic materials have increasing fluidity as the temperature increases. However, the temperature of the die 96 must maintain the filament 20 at a temperature level where the newly extruded filament 20 has sufficient tensile strength to be subsequently uniformly drawn without tearing.

The extruded filament 20 traverses the distance between the die 96 and an air knife 100 under tension T from the downstream puller 102. The downstream puller 102 is comprised of feed rollers 104, a motor 106 and a controller 108. In an exemplary embodiment two of the feed rollers 104 are serrated drive rollers 109, driven by the motor 106 under the control of the controller 108. The remaining two feed rollers are idler rollers mounted proximally to the drive rollers 109 to support the filament 20 as the drive rollers 109 act upon it. The controller 108 controls roller speed by providing control signals to the motor 106 which drives the rollers 104. The tension T is controlled by varying the roller speed while the rate of extrusion remains constant.

Many different types of feed rollers are possible, including urethane rollers, a single spring-loaded serrated roller, and a double spring-loaded serrated roller, as are different numbers of rollers. Further, various alternative types of puller means may be employed in place of puller 102, as will be recognized by those skilled in the art. An example would include creating filament tension by control of filament winding onto spool 110.

The force exerted on the filament 20 by the puller 102 stretches and draws-down the filament 20. The ratio of extruded diameter, $d_E$, to the drawn diameter, $d_F$, is preferably between 1.05:1 and 1.75:1. Thermoplastic materials with high $T_g$ can have greater draw-down than materials with lower $T_g$.

The drawn filament 20 passes through the air knife 100, which shears air against the filament 20 to terminate the drawing operation. In the exemplary embodiment the air knife 100 is provided with air that is cooled, filtered, and dried. The air provided to the air knife 100 is filtered to eliminate pump oil and particulates as the presence of oil or other chemical contaminants can craze the filament and induce fractures in subsequent handling.

Following the air knife 100, the filament 20 passes through an extended cooling zone 112 that continues to decrease the average filament temperature. In the exemplary embodiment, the extended cooling zone 112 is supplied with low velocity, dry, filtered, air. Dwell times of 5 to 10 seconds in the cooling zone are typically sufficient. In alternative embodiments, the filament can be cooled using other methods, such as by immersion or misting with a solvent.

Figure 10:
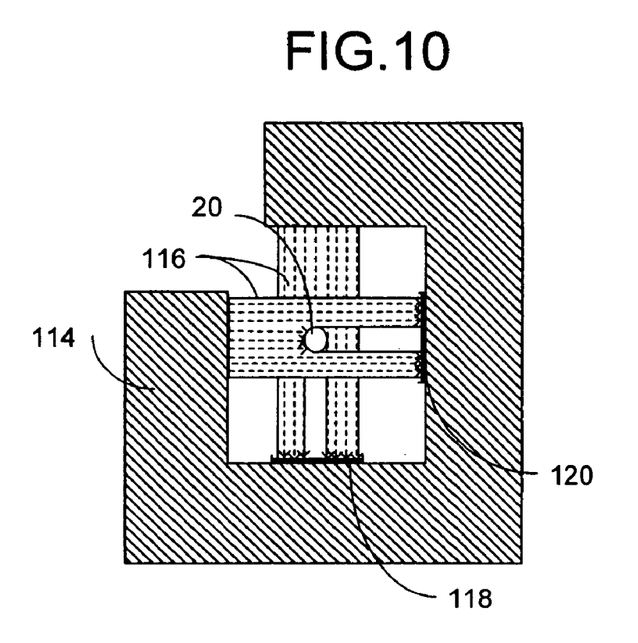
FIG. 10 is a plan view of an embodiment of the laser micrometer shown in FIG. 9.
Figure 11A:
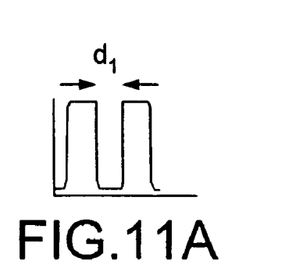
FIG. 11 is two graphical representations of laser micrometer measurements showing received intensity versus position.
Figure 11B:
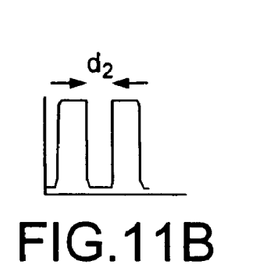

The diameter of the chilled filament 20 is then measured. In the exemplary embodiment, the measurement is done using a two-axis laser micrometer 114. FIG. 10 shows a detail of the measurement, viewed with the filament 20 emerging from the figure. Orthogonal light sheets 116 pass through a measuring zone and are detected on CCD arrays 118 and 120. FIGS. 11A and 11B are graphical representations of received intensity (vertical) versus position. The shadows cast by the filament are interpreted as measured orthogonal shadow diameters $d_1$ and $d_2$ by the CCD arrays. The filament diameter may alternately be measured by other means, such as capacitive, pneumatic, and rolling contact sensors as shown in U.S. Pat. No. 6,085,957.

The micrometer 114 measures $d_1$ and $d_2$ frequently and sends diameters $d_1$ and $d_2$ to a system controller 108, as shown in FIG. 9. The system controller 108 averages the measured orthogonal shadow diameters, $d_1$ and $d_2$ to produce an instantaneous filament diameter $d_F$, a long term average filament diameter $<d_F>$, and the long term standard deviation $\sigma_F$ representing variation in $<d_F>$ along the length of the filament. The target value of $<d_F>$ is set as $d_T$, and the standard deviation is maintained as per the tolerance requirements derived and analyzed as per FIG. 7. The system controller 108 utilizes a weighted average of $d_F$ and $<d_F>$ to drive a PID (Proportional Integral Differential) loop that regulates the puller 102 controlling tension T. In the exemplary embodiment, the diameters $d_1$ and $d_2$ are measured approximately 100 times per minute and are averaged over a range of approximately 12–15 seconds. The number of measurements taken and time span for calculation of an average and standard deviation may be altered, as will be apparent to those skilled in the art.

In an alternate embodiment, the system controller 108 controls tension T by regulating the rate of winding filament 20 onto spool 110. An alternative method of controlling tension T would be system control of the rate of extrusion while maintaining constant roller speed. Yet another alternative would be to use a system controller 108 to vary both the rate of extrusion and the roller speed.

In another alternative embodiment, the diameter, $d_E$, of the extruded filament 20 is measured by micrometer a short distance after the extruder die 96 before the filament is drawn and cooled. The system controller utilizes a weighted average of $d_E$ and $<d_E>$ to drive a PID loop that regulates the puller 102 controlling tension T. This embodiment has the advantage of reducing the lag time between measurement and control of the drawing process, but the disadvantage of measuring only an intermediate diameter. An additional embodiment could measure both $d_E$ and $d_F$ and use both of those parameters to control the drawing process.

The filament 20 emerging from the puller 102 is wrapped onto spool 110. After spooling, the filament 20 is usually vacuum dried to reduce its moisture content. As is described in application Ser No. 09/804,401 filed Feb. 27, 2001, moisture content of the spooled filament is typically of concern as excessive solvent or moisture in the filament creates gas and anomalous pressure in the liquifier. The filament 20 may be dried following its winding onto the spool 110, according to the requirements of the modeling system for which it is intended.

Other techniques will be recognized by skilled artisans for manufacturing filament according to the present invention. For example, in a second exemplary manufacturing embodiment, the filament is first formed below size, and is then used as a solid core for an annular extrusion. In a third exemplary embodiment, a slightly oversized filament is sized by a secondary die to achieve a tight tolerance.

Although the present invention has been described with reference to exemplary embodiments, workers skilled in the art will recognize that changes may be made in form and detail without departing from the spirit and scope of the invention. For example, the present invention utilizes the filament diameter as the controlled parameter. Alternative embodiments could utilize other dimensions, such as cross-sectional area or radius, as the controlled parameter.

The invention claimed is:

1. A feedstock of solid material for use in an extrusion apparatus, the feedstock comprising:
    a filament having a length and a diameter, wherein the length is greater than 20 feet, and wherein the diameter has an average value in the range between 0.069 and 0.074 inches and a standard deviation of less than or equal to 0.0004 inches over the length.

2. The feedstock of solid material of claim 1, wherein the standard deviation of the diameter of the filament is less than or equal to 0.0003 inches over the length.

3. The feedstock of solid material of claim 1, wherein over the length of the filament the average value of the diameter is in the range between 0.071–0.072 inches and the standard deviation of the diameter is less than or equal to 0.0003 inches.

4. The feedstock of solid material of claim 1, wherein over the length of the filament the average value of the diameter is in the range between 0.072–0.073 inches and the standard deviation of the diameter is less than or equal to 0.00015 inches.

5. The feedstock of solid material of claim 1, wherein the filament is thermoplastic.

6. A feedstock of solid material for use in an extrusion apparatus, comprising:
    a thermoplastic filament having a length and a diameter, wherein the length is greater than 20 feet, and wherein the diameter has an average value and a standard deviation over the length, such that the average value of the diameter of the filament is in the range between 0.069–0.074 inches and the standard deviation is less than or equal to the product of the average value of the diameter multiplied by 0.007.

7. The feedstock of solid material of claim 6, wherein the standard deviation of the diameter of the filament is less than or equal to 0.0004 inches over the length.

* * * * *